United States Patent [19]

Mutschler

[11] Patent Number: 4,592,247
[45] Date of Patent: Jun. 3, 1986

[54] CONTINUALLY ADJUSTABLE BALL-TYPE PLANETARY GEAR SET

[75] Inventor: Günter Mutschler, Biberach, Fed. Rep. of Germany

[73] Assignee: Neuweg Fertigung GmbH, Munderkingen, Fed. Rep. of Germany

[21] Appl. No.: 653,912

[22] Filed: Sep. 24, 1984

[30] Foreign Application Priority Data

Sep. 30, 1983 [DE] Fed. Rep. of Germany ....... 3335445

[51] Int. Cl.$^4$ ...................... F16H 15/26; F16H 57/00; F16H 13/06; F16H 15/50
[52] U.S. Cl. ......................................... 74/198; 74/798; 74/796; 74/721; 74/690; 74/411
[58] Field of Search ................. 74/198, 798, 796, 721, 74/690, 411

[56] References Cited

U.S. PATENT DOCUMENTS

| | | | |
|---|---|---|---|
| 2,941,422 | 6/1960 | Barish | 74/796 |
| 3,494,224 | 2/1970 | Fellows et al. | 74/796 |
| 3,707,888 | 1/1973 | Schottler | 74/796 |
| 3,745,844 | 7/1973 | Schottler | 74/198 |
| 3,793,907 | 2/1974 | Nakumura et al. | 74/198 |
| 4,287,791 | 9/1981 | Numazawa et al. | 74/411 |
| 4,345,486 | 8/1982 | Olesen | 74/198 |
| 4,398,436 | 8/1983 | Fisher | 74/411 |

FOREIGN PATENT DOCUMENTS

| | | | |
|---|---|---|---|
| 1119076 | 12/1961 | Fed. Rep. of Germany . | |
| 3215923 | 11/1983 | Fed. Rep. of Germany . | |
| 283515 | 1/1965 | Netherlands | 74/796 |

OTHER PUBLICATIONS

*Machine Design*, Dec. 1953, p. 244.

Primary Examiner—Lawrence J. Staab
Assistant Examiner—Michael D. Bednarek
Attorney, Agent, or Firm—Michael J. Striker

[57] ABSTRACT

In a continually adjustable ball-type planetary gear set which comprises a housing, a driving shaft, a driven shaft, rings provided with raceways engaging a plurality of planetary balls and positioned on the driving shaft, and a sleeve rotationally fixed with the driving shaft, the sleeve is a locked in rotation-fixed connection with the shaft only in the region of one end of the driving shaft by means of a toothing provided on the driving shaft to reduce static indetermination of the system and to reduce noises and wear of the sleeve.

3 Claims, 1 Drawing Figure

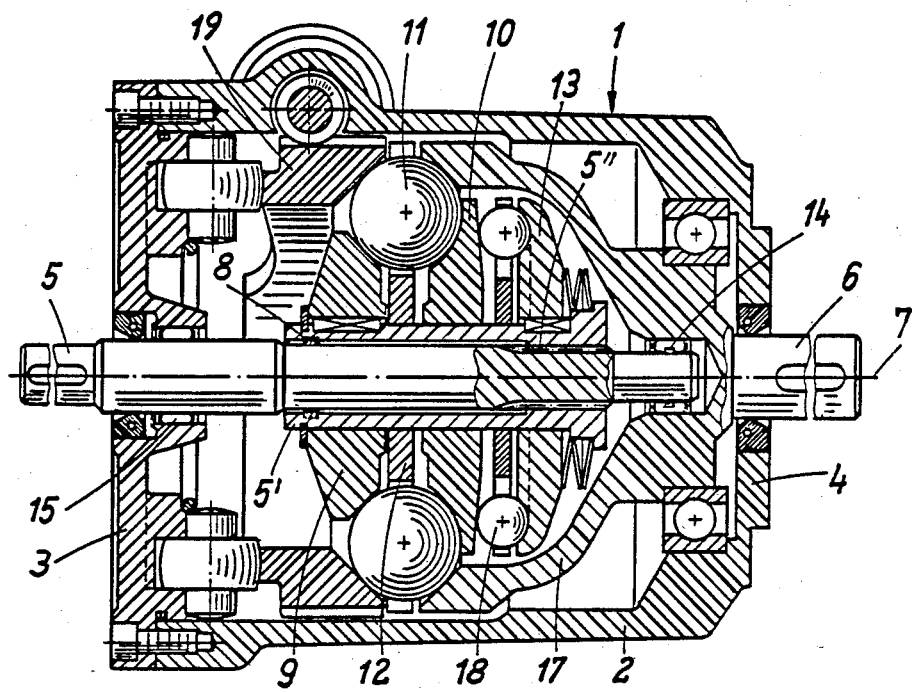

CONTINUALLY ADJUSTABLE BALL-TYPE PLANETARY GEAR SET

BACKGROUND OF THE INVENTION

The present invention relates to a continually adjustable ball-type planetary gear set.

Known planetary gear sets of the type under discussion include a housing in which a first driving shaft is supported for rotation which in turn supports rings carrying raceways which engage planetary balls. A second shaft is supported in the housing in alignment with the first shaft and is a driven shaft. The rings, the two of which are race rings and the two of which are guide rings are positioned on the driving and driven shafts, respectively, at respective adjustable axial distance from each other so that the raceways of the respective rings engage the planetary balls from above and from below.

One of conventional planetary gear sets of this type is disclosed in DB GM82 12 322. The disadvantage of this planetary gear set is that the construction is a system which is multiply redundant from the static point of view and presents the problems of considerable noise generation, significant wear, friction corrosion and the like. To limit these problems high manufacture precisions have been required for conventional planetary gear sets of this type.

SUMMARY OF THE INVENTION

It is an object of the present invention to provide an improved ball-type planetary gear set.

It is another object of this invention of minimize the disadvantages of conventional ball-type planetary gear sets of the type under discussion and to facilitate the manufacture of such gear sets by fewer high precision requirements.

These and other objects of this invention are attained by a continually adjustable ball-type planetary gear set, comprising a housing; a driving shaft and a driven shaft supported in said housing for rotation about a common axis; a first race ring mounted on the driving shaft for joint rotation therewith, a second race ring mounted to the driven shaft for joint rotation therewith, said first and second race ring being positioned at an adjustable axial distance from each other; a first guide ring arranged on said driving shaft for free rotation about said common axis and opposite to said first race ring; a second guide ring arranged on said driving shaft for free rotation about said common axis and opposite to said second race ring, said first guide ring and second guide ring being positioned at an adjustable axial distance from each other; plurality of planetary balls, said first race ring, said second race ring, said first guide ring and said second guide ring having raceways limiting an annnulus in which said planetary balls run, the axial distance between said second race ring and said second guide ring being adjustable in accordance with a desired ratio between the number of revolutions of the driven shaft and the number of revolutions of the driving shaft by an adjusting drive; a sleeve mounted on said driving shaft for joint rotation therewith, said first race ring being arranged on said sleeve for joint rotation therewith, said driving shaft having an end position which is provided with a toothing which connects said driving shaft with said sleeve in a locking rotation—fixed fashion, said driving shaft having a remaining portion which is surrounded by said sleeve with a play so as to allow for a radial movement of said sleeve relative to said driving shaft.

The sleeve has an end facing away from said toothing axially of the driving shaft; a damping ring may be arranged on the driving shaft between said sleeve and said driving shaft in the region of said end.

The second race ring having a bore; an additional damping ring may be mounted in said bore, said additional damping ring receiving an end of the driving shaft adjacent said toothing and allowing for a slight radial displacement of said end in said bore.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE of the drawings illustrates an axial sectional view through a ball-type planetary gear set according to the present invention.

DETAILED DESCRIPTION OF THE PREFERRED EMBODIMENT

Referring now to the drawing more specifically, reference numeral 1 designates the housing of the planetary gear set, which includes a substantially cylindrical housing portion 2 and two end lids 3 and 4. A driving shaft 5 is positioned in bearings in the left-hand lid 3 while a driven shaft 6 is disposed, also in a bearing, in the right-hand lid 4; both shafts have a common geometrical axis, which is a main axis 7 of the planetary gear set.

A guide ring 10, having a raceway, is positioned on the driving shaft 5 via a sleeve 5' so that the guide ring 10 is freely axially displaceable and freely rotatable on shaft 5. Sleeve 5' surrounds the driving shaft over a greater portion of the length of the shaft with a play and is rotation-stationarily connected to shaft 5 by a toothing 5" so that the sleeve can at its front region be radially moved a small distance. A damping ring 8 made out of elastic material limits the radial shifting movement of the sleeve relative to shaft 5. Another ring 9, also having a raceway, is fixed mounted on sleeve 5' so that the race ring 9 is rotated jointly with shaft 5. The raceways of rings 9 and 10 facing each other are arranged axially opposite to each other. The raceway of the fixed ring 9 is a bevelled surface while the raceway of the freely displaceable ring 10 is concave and matches the outer surface of planetary balls 11. The opposite raceways of rings 9 and 10 engage a plurality of planetary balls 11. The planetary or movement—transferring balls 11 are spaced from each other at uniform angular internals by a spacer 12 arranged on shaft 5 via the sleeve 5'.

At the end of driving shaft 5, remote from the driving race ring 9, is positioned a pressure disk or plate 13 which is mounted on sleeve 5 for joint rotation with driving shaft 5'. The pressure plate 13 is a component part of a pressing device which is the subject of the applicant's pending application Ser. No. 487,955 filed Apr. 25, 1983.

A further driven race ring 17, having a raceway, is positioned in housing 1. The end of driving shaft 5 is supported in the ring 17. The latter is fixed to the driven shaft 6 to rotate jointly with this shaft. Ring 17 is cup-shaped and surrounds the pressure plate 13 and the race ring 10. Ring 17 has a spherical raceway which is positioned substantially radially outwardly of the spherical raceway of ring 10 and engages planetary balls 11. An adjustment guide ring 19 is positioned axially opposite to the ring 17 and in cooperation therewith so that the bevelled raceway of ring 19 engages planetary balls 11 from another side. To adjust the translation ratio the adjustment guide ring 19 is axially displaceable. The raceway of guide ring 17 is positioned substantially radially outwardly of the raceway of the driving race ring 9.

The support of the free end of the driving shaft 5 in the drive race ring 17 can be obtained by a damping ring 14 so that shaft 5 would perform within the front housing lid 3 a slight pivoting movement about a bearing 15.

The aforementioned pressing device couples, via the pressure plate 13 and roller bodies 18 engaged in a cam track of the pressure plate, a guide ring 10, additionally provided with an end face track, with the shaft 5. The roller bodies 18 can be conical, spherical or have any other suitable shape.

It will be understood that each of the elements described above, or two or more together, may also find a useful application in other types of ball-type planetary gear sets differing from the types described above.

While the invention has been illustrated and described as embodied in a continually adjustable ball-type planetary gear set, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A continually adjustable ball-type planetary gear set, comprising a housing; a driving shaft and a driven shaft supported in said housing for rotation about a common axis; a first race ring mounted on the driving shaft for joint rotation therewith, a second race ring mounted to the driven shaft for joint rotation therewith, said first and second race ring being positioned at an adjustable axial distance from each other; a first guide ring arranged on said driving shaft for free rotation about said common axis and opposite to said first race ring; a second guide ring arranged on said driving shaft for free rotation about said common axis and opposite to said second race ring, said first guide ring and second guide ring being positioned at an adjustable axial distance from each other; a plurality of rolling bodies; said first race ring, said second race ring, said first guide ring and said second guide ring having raceways limiting an annulus in which said rolling bodies run while engaging the raceways of said race rings and guide rings, the axial distance between said second race ring and said second guide ring being adjustable in accordance with a desired ratio between the number of revolutions of the driven shaft and the number of revolutions of the driving shaft; a sleeve mounted on said driving shaft for joint rotation therewith, said first race ring being arranged on said sleeve for joint rotation therewith, said driving shaft having an end portion which is provided with a toothing which connects said driving shaft with said sleeve in a locking rotation—fixed fashion, said driving shaft having a remaining portion which is surrounded by said sleeve with a play so as to allow for a slight radial movement of said sleeve relative to said driving shaft whereby raceways of said first race ring and said first guide ring are adjusted to said rolling bodies thus reducing wear and vibrations of said rolling bodies and said first race and guide rings.

2. The ball-type planetary gear set as defined in claim 1, wherein said sleeve has an end facing away from said toothing axially of the driving shaft, and wherein a damping ring is arranged on the driving shaft between said sleeve and said driving shaft in the region of said end.

3. The ball-type planetary set as defined in claim 2, said second race ring having a bore, and wherein an additional damping ring is mounted in said bore, said additional damping ring receiving an end of the driving shaft adjacent said toothing and allowing for a slight radial displacement of said end in said bore.

* * * * *